United States Patent [19]

Waniczek et al.

[11] 4,395,517

[45] Jul. 26, 1983

[54] MODIFIED OLEFINE POLYMERS

[75] Inventors: Helmut Waniczek, Cologne; Carlhans Süling, Odenthal; Christian Lindner, Cologne; Herbert Bartl, Odenthal, all of Fed. Rep. of Germany

[73] Assignee: Bayer Aktiengesellschaft, Leverkusen, Fed. Rep. of Germany

[21] Appl. No.: 274,545

[22] Filed: Jun. 17, 1981

[30] Foreign Application Priority Data

Jun. 25, 1980 [DE] Fed. Rep. of Germany ....... 3023822

[51] Int. Cl.$^3$ .................. C08L 75/06; C08L 67/00; C08L 69/00

[52] U.S. Cl. .................... 525/168; 525/126; 525/146

[58] Field of Search .............. 525/168, 126, 146

[56] References Cited

U.S. PATENT DOCUMENTS

| | | | |
|---|---|---|---|
| 3,256,362 | 6/1966 | Craubner | 525/168 |
| 3,988,388 | 10/1976 | Alberts | 525/168 |
| 4,005,037 | 1/1977 | Mittzsch | 525/63 |
| 4,008,294 | 2/1977 | Marans | 525/168 |
| 4,160,759 | 7/1979 | Gardner | 525/168 |
| 4,161,471 | 7/1970 | Kassal | 525/168 |
| 4,245,059 | 1/1981 | Ichimura | 525/168 |
| 4,320,045 | 3/1982 | Owen | 525/168 |

FOREIGN PATENT DOCUMENTS 1080254  8/1967  United Kingdom .

*Primary Examiner*—Paul Lieberman
*Attorney, Agent, or Firm*—Connolly and Hutz

[57] ABSTRACT

Modified olefine polymers of 20 to 98 parts by weight of an olefine homopolymer or copolymer and 0.5 to 80 parts by weight of a polymer containing aliphatic polyester blocks, which polymers are chemically linked through 0.5 to 40 parts by weight of a polymer of a monomer containing olefinic double bonds, a method for their manufacture, and their employment as moulding compositions.

3 Claims, 1 Drawing Figure

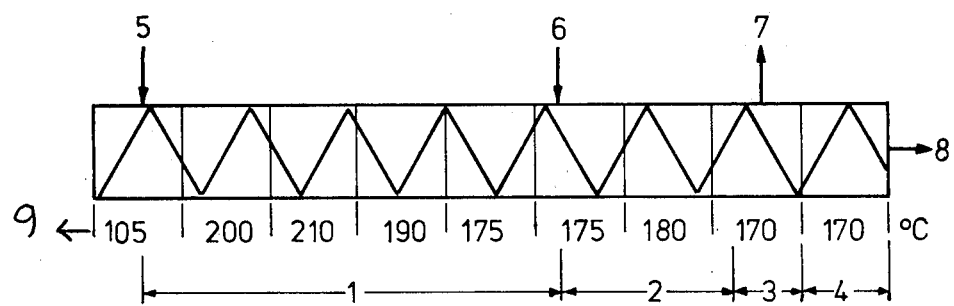

MODIFIED OLEFINE POLYMERS

This invention relates to modified olefine polymers in which olefine homo- or copolymers are chemically linked to polymers containing polyester blocks by way of polymerised units of monomers containing olefinic double bonds. Graft polymers of monomers containing olefinic double bonds on polyolefines are known, one example being polypropylene on which polar olefinic monomers are grafted (see French Patent No. 1,420,772 and U.S. Pat. No. 3,642,852). These products, however, do not contain any plasticizing polyester components.

According to German Offenlegungsschrift No. 2,903,135, unsaturated polyesters and unsaturated polyolefine rubbers (so-called EPDM rubbers) are reacted with monomers. The polyester moulding compositions obtained are thermosetting e.g. hardenable casting resins, and they cannot be worked thermoplastically.

The present invention provides a process for the preparation of modified olefine polymers, which is characterised in that 20 to 98 parts by weight of an olefine homopolymer or copolymer, 0.5 to 80 parts by weight of a polymer containing aliphatic polyester blocks and 0.5 to 40 parts by weight of a monomer containing olefinic double bonds are polymerised in the presence of radical initiators at 50° to 250° C. in the absence of solvents.

The invention further provides modified olefine polymers of 20 to 98 parts by weight of an olefine homopolymer or copolymer and 0.5 to 80 parts by weight of a polymer containing aliphatic polyester blocks which are chemically linked through 0.5 to 40 parts by weight of a polymer of a monomer containing olefinic double bonds.

The modified olefine polymers may be characterised by the following structure (I):

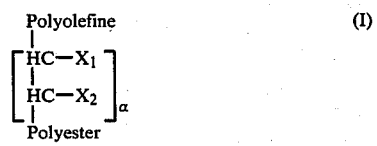

wherein
$X_1$, $X_2$ and $\alpha$ have the meaning indicated below.
Special modified olefine polymers correspond to formula (II):

wherein
$X_1$ and $X_2$ denote, independently of each other, H, $C_1$-$C_4$-alkyl, halogen (such as chlorine), COOH or a derivative thereof (such as an ester, anhydride, nitrile or carbonamide) or acyloxy (such as acetyloxy, propionyloxy or benzoyloxy);

$R_1$ to $R_9$ denote, independently of each other, H, alkyl, aryl or alkylaryl (preferably $C_1$ to $C_4$ alkyl or aryl, optionally substituted with $C_1$ to $C_4$-alkyl), A and B denote, independently of each other, polyester or polyether groups and D and E denote, independently of each other, the end groups obtained from the stereospecific polymerisation of $\alpha$-olefines.

The polyester or polyether chains A and B are preferably polyalkylene oxide chains which have been obtained by the polymerisation of, for example, ethylene oxide, propylene oxide, tetrahydrofuran or mixtures thereof, or polyester chains which have been obtained by the polycondensation of dicarboxylic acids with diols or by the condensation of dicarboxylic acid derivatives (such as esters, chlorides or anhydrides) with diols, and polyaddition products of lactones e.g. caprolactone.

Olefine homopolymers and copolymers for the purpose of this invention are preferably homopolymers of $C_2$-$C_8$ olefines or copolymers of different $C_2$-$C_8$ olefines or copolymers of $C_2$-$C_8$ olefines with other monomers, e.g. vinyl esters (vinyl acetate or propionate), carbon monoxide, maleic acid anhydride or styrene. The proportion of such monomer units in the polymer should not exceed 50% by weight. Polypropylene having an isotactic proportion above 90% (determined by NMR spectroscopy of a solution of the polypropylene in trichlorobenzene) and a melt index (IMI) of 5 to 20 g per 10 min, preferably 5 to 15 g per 10 min, determined at 230° C. and 2.16 kg load is particularly suitable. Polypropylenes of this nature are commercially available.

The following are examples of polymers containing aliphatic polyester blocks:

(a) Polyesters containing carbonate groups, built up of recurrent structural units of the following formula:

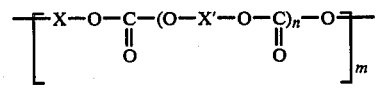

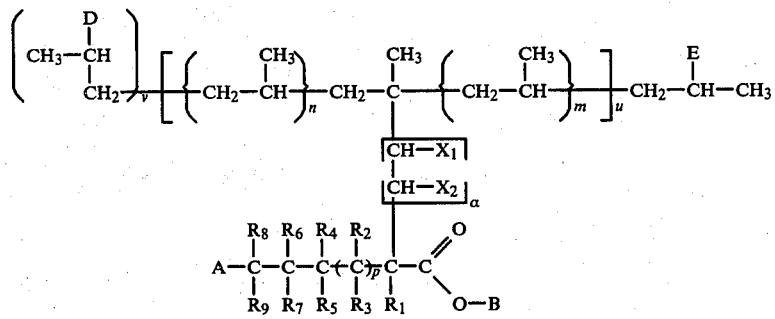

v = 1–15,000
n = 0 to 15,000
m = 0 to 15,000
α = 1 to 1,000
u = 1 to 4,
p = 1 to 4 wherein

X = the group of a reaction product of a polyhydric alcohol and a polybasic aliphatic carboxylic acid;

X' = X or an aliphatic polyether group;

n = 0 or 1 to 10;

m = a number > 10.

Polyesters containing carbonate groups are known and have been described, e.g. in German Offenlegungsschrift No. 2,732,718. They are prepared by catalytic reaction of polyester diols with diarylcarbonates at elevated temperatures.

(b) Polyesters containing urethane groups. These may be obtained by, for example, the reaction of aliphatic saturated polyester diols with diisocyanates. Products of this type are known and have been described as components of plastics materials in German Auslegeschrift No. 1,193,241.

(c) Block copolymers of aliphatic polyester blocks and polyether blocks or aromatic polyester blocks or aromatic or aliphatic polycarbonate blocks. Products of this kind are known.

(d) Aliphatic saturated polyesters having molecular weights in the region of about 600 to 10,000;

(e) Aliphatic or aliphatic-aromatic polyurethanes normally prepared by the reaction of diols with diisocyanates. These products are also known.

The following are examples of suitable monomers containing olefinic double bonds: Vinyl monomers and vinylidene monomers such as vinyl acetate, vinyl chloride, vinyl phenyl disiloxane, 2- and 4-vinyl pyridine, vinyl pyrrolidone and vinyl carbazole; divinyl monomers such as divinylbenzene, 2,3-divinylpyridine, divinylsulphone and 2,5-divinyl-6-methylpyridine; acrylic and methacrylic acids and their derivatives, e.g. amides and nitriles, and esters in which the alkyl groups contain 1 to 8 carbon atoms, such as ethyl, propyl, butyl, amyl, hexyl, heptyl and octyl acrylic acid, phenyl acrylic acid, vinyl acrylic acid and the like; acrylate monomers such as methyl acrylate, methyl methacrylate, ethyl acrylate, butyl methacrylate, butyl acrylate, acrylamide, 2-hydroxyethyl acrylate, 2-hydroxyethyl methacrylate, alkylamino- and dialkylaminoacrylates and the like; styrene and various derivatives thereof, such as α-methyl styrene, chlorostyrene, dichlorostyrene and di- or trimethyl styrene; and polymerisable monomers containing carboxylic acid ester or anhydride groups, such as maleic acid anhydride, fumaric acid, crotonic acid, itaconic acid and its anhydride, maleic imide and fumarates such as diethyl fumarate and dioctyl fumarate.

The following are preferred: Styrene, vinyl acetate, acrylonitrile, methyl methacrylate, ethyl and butyl acrylate and diisobutylene, and in particular vinyl esters, e.g. vinyl acetate and vinyl propionate.

The preferred radical initiators are atmospheric oxygen, peroxides and azo compounds. Examples of peroxides include dialkylperoxides, diacylperoxides and hydroperoxides. The dialkylperoxides generally have the structure, R-OO-R', wherein R and R' may be identical or different and may be primary, secondary or tertiary alkyl, cycloalkyl or alkoxy groups. Specific examples of such peroxides include dicumyl peroxide, di-t-butylperoxide, t-butylcumylperoxide and 2,5-dimethyl-2,5-bis-(t-butyl-peroxy)hexane.

Diacylperoxides have the general structure RC(O)OOC(O)R' wherein R and R' may be identical or different, as in alkyl, alkoxyl, aryl, cycloalkyl or heterocyclic groups. Examples of diacylperoxides include dilaurylperoxide, dibenzoyl peroxide, diacetylperoxide and 2-methylpentanoylperoxide.

Hydroperoxides are compounds having the general formula R-OOH wherein R may be an alkyl, hydroxyalkyl or cycloalkyl group. Peroxides such as methyl ethyl ketone peroxide or cyclohexanone peroxide or t-butylperoctoate and t-butylperbenzoate may also be used. It is preferred to use peroxides such as di-t-butylperoxide, t-butylperbenzoate and diacetylperoxide.

Examples of azo compounds include diazoaminobenzene, N,N'-dichloroazodicarbonamide, azo-bis-(carboxyl acid esters), azo-bis-(isobutyronitrile) and 1-cyano-1-(t-(butylazo)-cyclohexanone.

Olefine polymers which have been modified according to the invention contain from 0.5 to 80 parts by weight, preferably from 1 to 50 parts by weight and in particular from 5 to 20 parts by weight of the polymer which contains aliphatic polyester blocks. The quantity of olefine homopolymer or copolymer is from 20 to 98 parts by weight, preferably from 60 to 95 parts by weight. In addition, the polymer contains from 0.5 to 40 parts by weight, preferably from 0.5 to 10 parts by weight, of the polymer of the monomer which contains olefinic double bonds.

To prepare the modified olefine polymers, the components are mixed without solvents and polymerised with the aid of radical initiators. The radical initiators are preferably used in quantities of from 0.1 to 3% by weight, based on the total quantity of reactants. The polymerisation temperature is from 50° to 250° C., preferably from 100° to 220° C. The reactors used are preferably high viscosity reactors, in particular kneaders and single shaft or multishaft extruders. The usual auxiliary agents such as solubilizing agents, plasticizers, lubricants or auxiliary liquids may be added in the course of polymerisation, if necessary. It may be advantageous to carry out polymerisation at excess pressure and optionally under protective gases such as nitrogen or a noble gas.

The modified olefine polymers according to the invention are graft copolymers of two polymer components linked together by bridges consisting of polymer chains of the particular olefinic monomers added. In radical polymerisation, polymers grow on the basic polymer and recombine to form polymer bridges while at the same time the radical ends of the graft branches may react with another polymer chain by a transfer reaction. It is in this way that, in addition to the bridges between similar macromolecules, bridges between the polyolefine component and the polyester component are formed. This chemical linkage results in an overall improvement in compatibility which in turn results in technically interesting properties. The polymers according to the invention are thermoplasts and may therefore be used wherever polypropylene is used but have better processing characteristics. For example, when the materials are extruded, the torques produced are much lower than those produced by the usual polypropylenes.

EXAMPLE 1

FIG. 1 is a schematic representation of the two-shaft extruder used as reactor. The reference numerals have the following meaning:

(1) melting zone
(2) polymerisation zone
(3) evaporation zone
(4) discharge (5) polymer inlet
(6) monomer inlet
(7) degasification
(8) discharge
(9) reaction temperatures.

The numbers at the bottom of the Figure give the temperature profile in degrees Centigrade.

A double shaft extruder (see sketch) is charged with 1500 g/h of a mixture of 98% by weight of polypropylene and 2% by weight of a polyester chain lengthened by way of carbonate groups. Downstream of the melting zone, 180 ml/h of a solution of 1.0 g of di-tert.-butylperoxide in 200 ml of vinyl acetate are forced into the polymer melt through an aperture. The polymerisation zone is followed by the evaporation zone where excess monomer is evaporated off under a vacuum. The cograft polymer formed is drawn off at the nozzle and granulated. The demonomerised reaction product has the following characteristics.

Melt Index: 1.69 $\frac{g}{10 \text{ min.} \times 2.16 \text{ kg}}$ at 190° C.

O content 0.35%.

The evidence for cografting was obtained by fractionation.

EXAMPLE 2

An oil heated kneader having a capacity of 5 l is charged with 2760 g of polypropylene and 240 g of a polyester lengthened through carbonate groups. It is heated to 170° C. while the reactants are kneaded.

A solution of 0.4 g of di-tert.-butylperoxide in 80 g of vinyl acetate is then pumped into the tightly sealed kneader within 1 hour. Kneading is continued for a further 10 minutes at 170° C. and the pressure is then released and the kneader emptied. The reaction product has a melt index of 2.12 $\frac{g}{10 \text{ min.} \; 2.16 \text{ kg}}$ at 190° C.

O content 0.88%.

Cografting was determined by fractionation (method of separated liquids according to R. Kuhn, Makromol. Chem. 177, 1525–1547 (1976)).

TABLE 1

|  | $KZ_{23}$ kpcm/cm² | RF kp/cm² | D/RF % | KH N/mm² | BF N/mm² | Vicat temp. °C. |
|---|---|---|---|---|---|---|
| Example 1 | 5.13 | 23.09 | 436 | 60.1 | 46.91 | 78 |
| Example 2 | 5.70 | 22.35 | 366 | 52.7 | 36.42 | 72 |
| Polypropylene | 2.91 | 21.32 | 83.7 | 60.3 | 43.04 | 80 |

$KZ_{23}$ Notched impact strength at 23° C. (small standard rod)
RF Tensile strength (shoulder rod)
D/RF Elongation on tearing
KH Ball pressure hardness
BF Flexural strength The samples were produced using an electrically heated plastics press at 190° C.

We claim:

1. A process for the preparation of modified olefine polymers, wherein 20 to 98 parts by weight of an olefine homopolymer or copolymer, 0.5 to 80 parts by weight of a polymer containing saturated aliphatic polyester blocks and 0.5 to 40 parts by weight of a monomer containing olefinic double bonds are polymerized in the presence of a radical initiator at 50° to 250° C. in the absence of a solvent.

2. Modified olefine polymers of 20 to 98 parts by weight of an olefine homopolymer or copolymer and 0.5 to 80 parts by weight of a polymer containing saturated aliphatic polyester blocks, which polymers are chemically linked through 0.5 to 40 parts by weight of a polymer of a monomer containing olefinic double bonds.

3. Modified olefine polymers corresponding to formula (II):

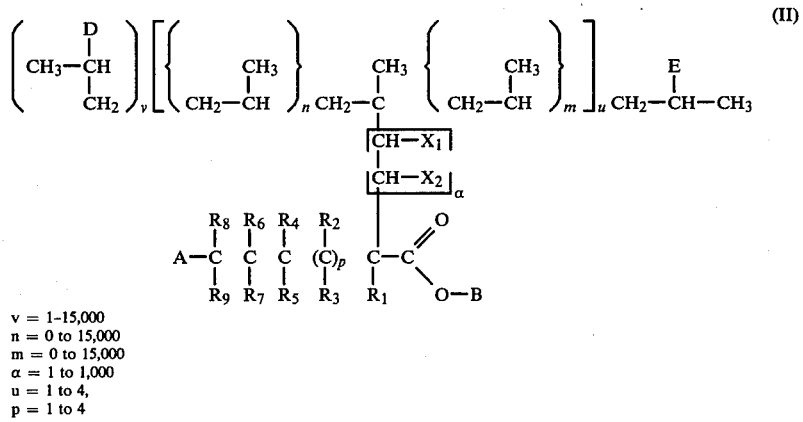

$v = 1-15,000$
$n = 0 \text{ to } 15,000$
$m = 0 \text{ to } 15,000$
$\alpha = 1 \text{ to } 1,000$
$u = 1 \text{ to } 4,$
$p = 1 \text{ to } 4$ wherein $X_1$ and $X_2$ denote, independently of each other, H, $C_1$–$C_4$-alkyl, halogen, COOH or a derivative thereof, or acyloxy;

$R_1$ to $R_9$ denote, independently of each other, H, alkyl, aryl or alkylaryl;

A and B denote, independently of each other, polyester groups; and

D and E denote, independently of each other, the end groups formed from the stereospecific polymerization of $\alpha$-olefines.

* * * * *